United States Patent [19]

Haÿ

[11] Patent Number: 4,512,779
[45] Date of Patent: Apr. 23, 1985

[54] METHOD AND INSTALLATION FOR SEPARATING A COMPOSITE GAS BY ADSORPTION

[75] Inventor: Léon Haÿ, Paris, France

[73] Assignee: L'Air Liquide, Societe Anonyme pour l'Etude et l'Exploitation des Procedes Georges Claude, Paris, France

[21] Appl. No.: 546,852

[22] Filed: Oct. 31, 1983

[30] Foreign Application Priority Data

Nov. 12, 1982 [FR] France .................. 82 19006

[51] Int. Cl.³ .................................. B01D 53/04
[52] U.S. Cl. .................................. 55/26; 55/62; 55/68; 55/74; 55/179; 55/387
[58] Field of Search ............... 55/25, 26, 58, 62, 74, 55/75, 179, 180, 387, 389

[56] References Cited

U.S. PATENT DOCUMENTS

| | | | |
|---|---|---|---|
| 3,430,418 | 3/1969 | Wagner | 55/25 |
| 3,564,816 | 2/1971 | Batta | 55/26 |
| 3,636,679 | 1/1972 | Batta | 55/26 |
| 3,702,525 | 11/1972 | Simonet et al. | 55/25 |
| 3,788,037 | 1/1974 | Shell et al. | 55/58 |
| 3,796,022 | 3/1974 | Simonet et al. | 55/25 |
| 3,977,845 | 8/1976 | Walter | 55/25 |
| 3,986,849 | 10/1976 | Fuderer et al. | 55/25 |
| 4,042,349 | 8/1977 | Baudouin et al. | 55/25 |
| 4,194,890 | 3/1980 | McCombs et al. | 55/25 X |
| 4,234,322 | 11/1980 | De Meyer et al. | 55/25 X |
| 4,263,018 | 4/1981 | McCombs et al. | 55/25 X |
| 4,340,398 | 7/1982 | Doshi et al. | 55/25 |
| 4,360,362 | 11/1982 | Asztalos | 55/25 X |
| 4,375,363 | 3/1983 | Fuderer | 55/25 |
| 4,381,189 | 4/1983 | Fuderer | 55/26 |

FOREIGN PATENT DOCUMENTS 1272891 7/1968 Fed. Rep. of Germany .
1769936 12/1970 Fed. Rep. of Germany .

*Primary Examiner*—Robert Spitzer
*Attorney, Agent, or Firm*—Lee C. Robinson, Jr.

[57] ABSTRACT

In a method comprising an isobaric production phase, a co-current depressurization phase, optionally carried out in a plurality of stages, a counter-current elution phase and a counter-current repressurization phase, optionally carried out in a plurality of stages, the successive balancing phases between two adsorption columns 1, 2, 3, 4 are carried out by passage in an auxiliary column 46, 70 with flow in opposite directions of the gaseous currents corresponding to two successive balancings.

14 Claims, 7 Drawing Figures

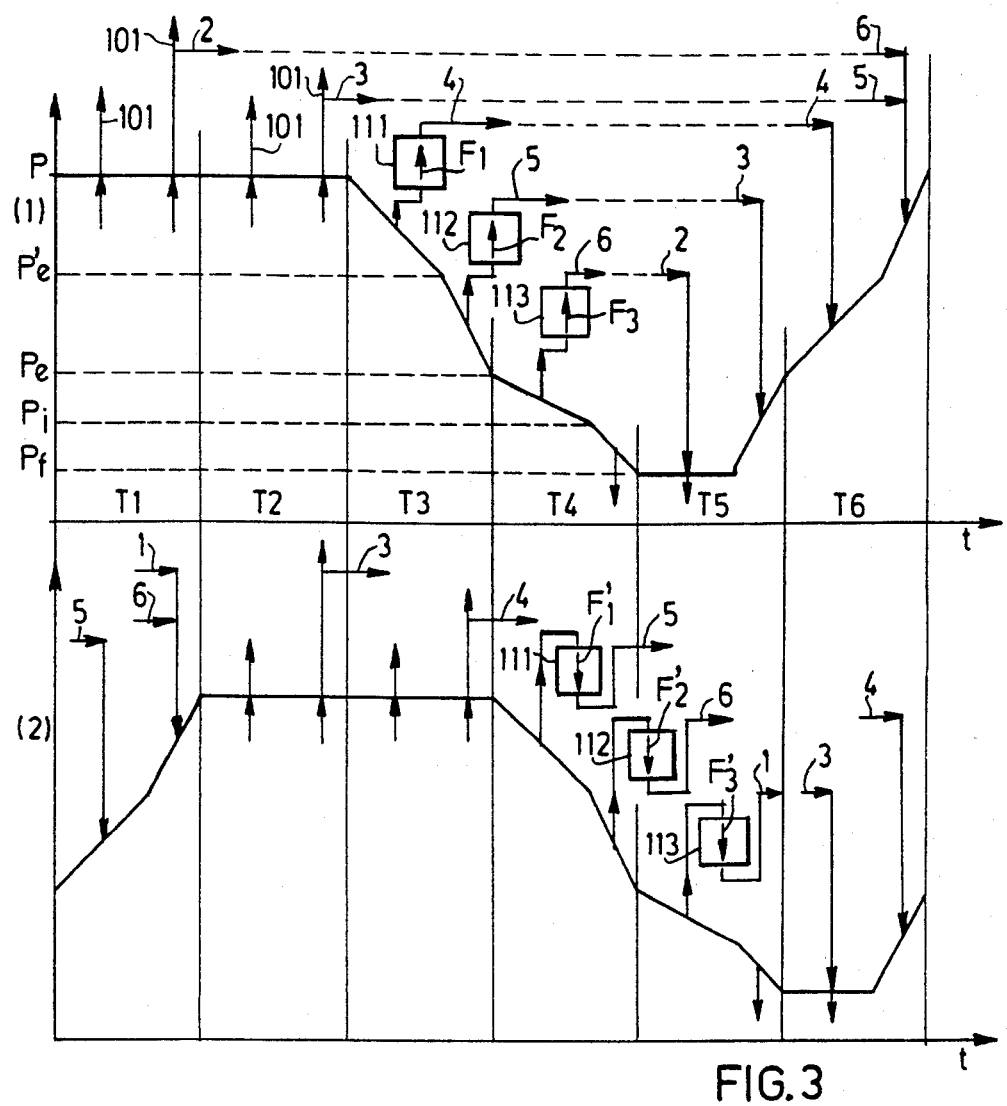
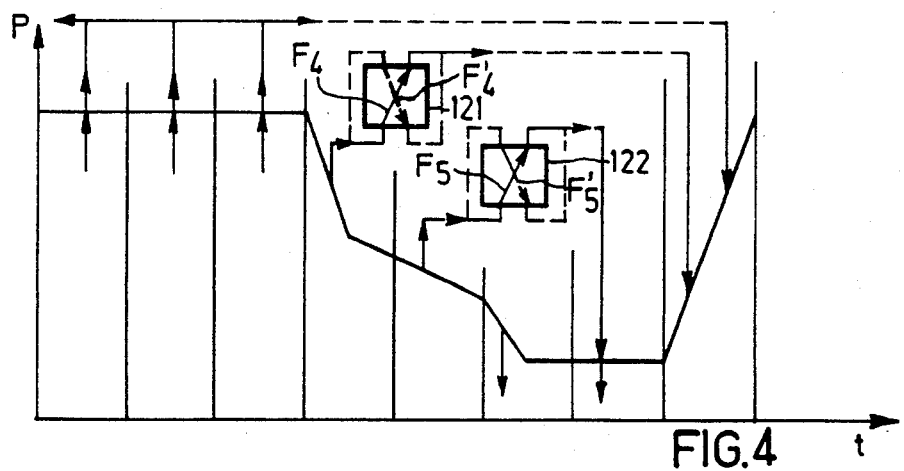
FIG. 3
FIG. 4

METHOD AND INSTALLATION FOR SEPARATING A COMPOSITE GAS BY ADSORPTION

The invention relates to a method for separating by adsorption a composite gas constituted by at least two components of the type using of at least three adsorbing columns (or adsorbers), in each of which are carried out in a cylic and staggered manner with respect to time from one adsorption column to another adsorption column, the following operational phases:

(a) a production phase at a pressure, termed high pressure, with circulation, termed a co-current circulation, of said composite gas and production of a separated gaseous current and trapping of at least one component in said column with, during a part of said production phase, the bypassing of a fraction of said separated gaseous current for a final counter-current repressurization of an adsorber in course of repressurization in accordance with phase (g) mentioned below;

(b) a co-current depressurization phase, with the drawing-off of a gaseous current for the purpose of the repressurization by balancing at an intermediate pressure level of an adsorber in the course of repressurization, in accordance with phase (f) mentioned below, said depressurization phase corresponding to a balancing which may be split up into a plurality of depressurization stages, each one of which, for the repressurization of different adsorbers, at intermediate pressure levels still in accordance with the phase (f);

(c) a co-current depressurization phase to a low intermediate pressure with the drawing-off of a gaseous current for the purpose of elution of an adsorber in the course of elution, in accordance with phase (e) mentioned below;

(d) a counter-current final depressurization phase down to the pressure termed low pressure which may be the atmospheric pressure;

(e) a counter-current elution phase at the regeneration pressure, termed low pressure, the elution current coming from an adsorber in the course of depressurization in accordance with the phase (c);

(f) a counter-current repressurized phase by balancing of the pressures with an adsorber in the course of depressurization in accordance with phase (b), it being possible to split up said repressurization phase into a plurality of successive steps by balancing of the pressures with the various adsorbers in the course of depressurization, in accordance with phase (b);

(g) a final counter-current repressurization phase, the repressurization current coming from the bypassing of a fraction of the current issuing from an adsorber in the course of production in accordance with phase (a).

This procedure is employed for producing very pure hydrogen (99.999%) from mixtures as varied as reforming gas employing vapour, "platforming" gas, draining gas of an ammonia or methanol synthesis installation, nitrogen washing gas, cracked ammonia or other mixtures containing a high proportion of hydrogen (50 to 98%). The number of adsorption columns and the complexity of an operational cycle depend on the nominal power of the installation and, in some cases, when the production is of the order of 50,000 m$^3$/h of hydrogen, a high number of adsorption columns, which may be as much as ten and more, may be reached.

An object of the present invention is to achieve a still higher efficiency and a higher purity of gas produced and this is achieved, according to an essential feature of the invention, by the fact that each balancing between any two adsorption columns is effected by passing the balancing current into an auxiliary column having a longitudinal segregation of the trapped component, and by reversing the direction of flow in said column for two homologous successive balancing currents, i.e. with the same initial and final pressure. By "longitudinal segregation of the trapped component" is meant a means for retaining the trapped component which forms a concentration front which progresses in the longitudinal direction from the inlet end toward the outlet end of the auxiliary column. In this way, and owing to the reversings of the direction of flow of the balancing current, it is ensured that, in the course of a balancing, the current which is introduced into an absorption column has its content of trapped component which decreases as the balancing phase progresses; in other words, an adsorber is put back under pressure with gas having a content of trapped component which is lower and, as this repressurization is effected counter-current to the normal direction of production, termed co-current, the highest concentration of impurities has been urged back further than was possible with the prior art toward the inlet end of the adsorber. Consequently, in the course of a following production phase, these impurities will appear later and by commencing with the lowest content at the outlet end during this production phase so that there is thus achieved either an improved efficiency or a higher purity of the gas produced.

According to a complementary form of the invention, the operational phases of depressurization of an adsorption column creating an expanded gaseous current for the elution of another adsorption column are carried out also by circulation of the elution gas current in another auxiliary column employing a longitudinal segregation of the trapped component, the elution currents of two successive depressurization phases having opposite directions of circulation in said auxiliary column. In this way it is ensured that the elution is carried out with a gas current having a content of impurities which is progressively reduced in the course of the elution phase. Owing to this second arrangement, advantageously combined with the preceding arrangement, the two successive elution and repressurization operations in respect of the same adsorber, which are carried out with a counter-current, are achieved with a gas current having a content of impurities which is progressively reduced in the course of the two consecutive phases, so that the highest concentration of impurities has been urged back further in said adsorber. Consequently, in the course of the following production phase with said adsorber, these impurities will appear later and by commencing with the lowest content at the outlet end so that there is achieved either an improved efficiency or a higher purity of the gas produced.

According to a preferred form of carrying out the invention, each column relating to a longitudinal segregation of the trapped component is an adsorption column, but this auxiliary column relating to a longitudinal segregation of the trapped component may also be a simple vessel of elongated shape having a volume at least equal to that of the depressurized gas.

Another object of the invention is to provide an installation for separating by adsorption a composite gas which employs the foregoing method.

The features and advantages of the invention will be apparent from the following description with reference to the accompanying drawings in which:

FIG. 3 represents the diagrams of pressure as a function of time relating to two of the six adsorbers of an installation operating cyclically;

FIGS. 4, 5, 6 and 7 represent the diagram of the pressure as a function of time in respect of any one of the adsorbers of an installation having respectively eight, ten, eight and four adsorbers operating cyclically and constituting four other ways of carrying out the invention.

Figure 1:
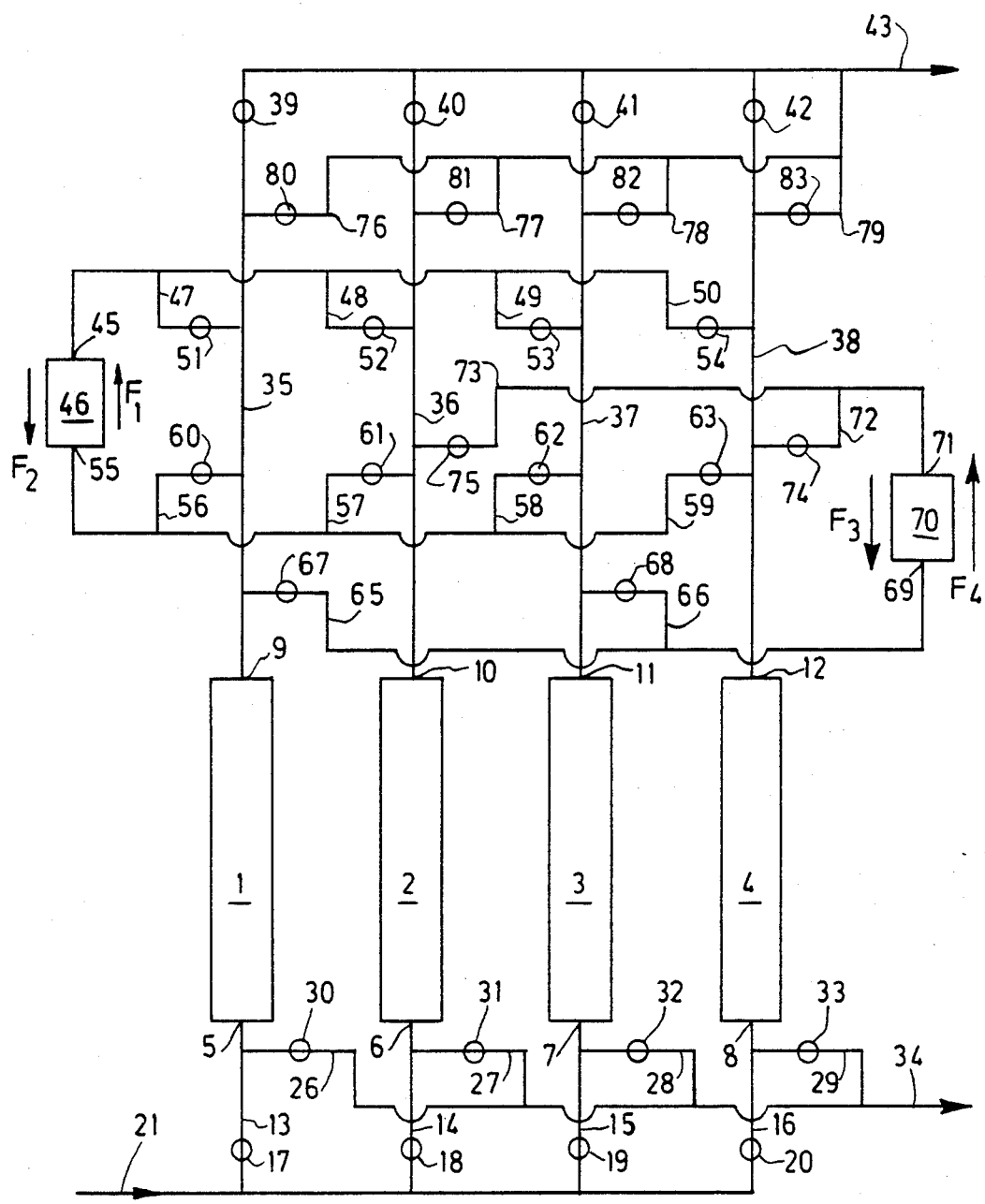
FIG. 1 is a diagrammatic view of a separating installation according to the invention.
Figure 2:
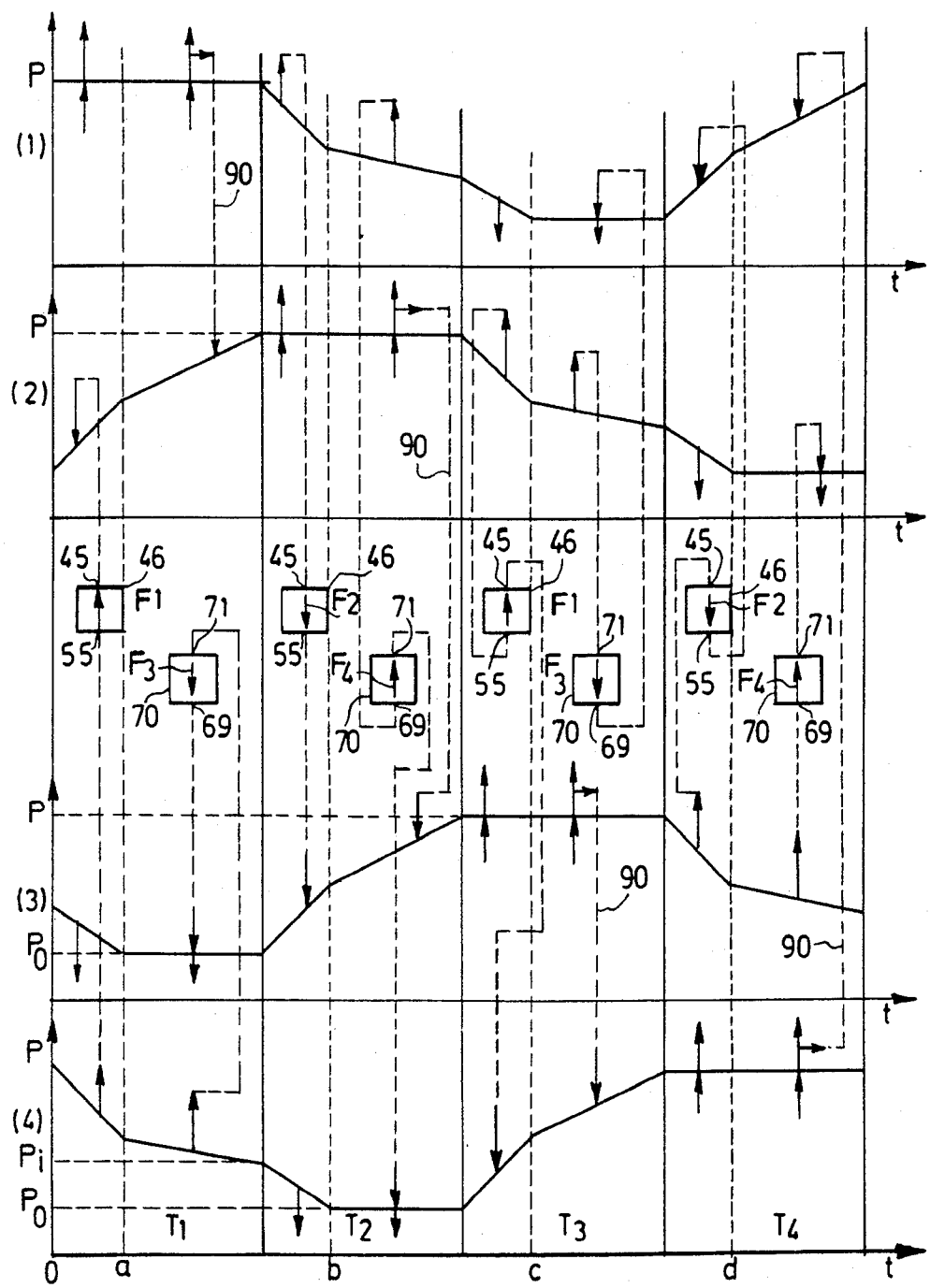
FIG. 2 represents the diagrams of pressure as a function of time concerning each of the four adsorbers of an installation according to FIG. 1 operating cyclically.

With reference first of all to FIGS. 1 to 2, an installation for separating by adsorption according to the invention comprises four adsorption columns, 1, 2, 3, 4 having inlet ends 5, 6, 7, 8 respectively and outlet ends 9, 10, 11, 12 respectively. Each inlet end 5, 6, 7, 8 is connected by a pipe 13, 14, 15, 16 having a stop valve 17, 18, 19, 20 respectively to a composite gas supply pipe 21. Likewise, each inlet end 5, 6, 7, 8 is connected by a drawing-off pipe 26, 27, 28, 29 having a stop valve 30, 31, 32, 33 to pipe 34 for eliminating residual substances.

The outlet ends 9, 10, 11, 12 of the columns 1, 2, 3, 4 are connected by a drawing-off pipe 35, 36, 37, 38 having a stop valve 39, 40, 41, 42 to a production pipe 43. Likewise, each outlet end 9, 10, 11, 12 is connected to one end 45 of an auxiliary adsorption column 46 by a pipe 47, 48, 49, 50 having a stop valve 51, 52, 53, 54 on one hand, and to the other end 55 of the auxiliary column 46 by a pipe 56, 57, 58, 59 having a stop valve 60, 61, 62, 63, on the other hand. The outlet ends 9, 11 of the adsorption columns 1, 3 are connected by pipes 65, 66, having a stop valve 67, 68 to one end 69 of a second auxiliary adsorption column 70 whose other end 71 is connected by pipes 72, 73 having a stop valve 74, 75 to the outlet end 10, 12 of the adsorption columns 2, 4.

The production line 43 is connected by pipes 76, 77, 78, 79 having a stop valve 80, 81, 82, 83 respectively to the outlet ends 9, 10, 11, 12 of the adsorption columns 1, 2, 3, 4.

The installation shown in FIGS. 1 to 2 operates in the following manner, it being assumed that the installation has just started up or, in other words, that it concerns the first operational cycle.

At instant 0, the adsorber 1 is in the production phase, i.e. the valves 17 and 39 are open and the separated gas is discharged at 43;

the adsorber 2 is in the phase of the beginning of the recompression by balancing with the adsorber 4, the valves 63 and 52 being open, the balancing current flowing through the pipes 59 and 48 and through the auxiliary adsorber 46 in the direction ($F_1$); the adsorber 3 commences its final decompression phase by drawing off the residues through the pipes 28 and 34, the valve 32 being open and the pipe 34 discharging the residues.

the adsorber 4 is at the beginning of the decompression balancing with the adsorber 2 as mentioned before.

At the end of a certain time within the period $T_1$, which corresponds to ¼ of the duration of the cycle, and more precisely at instant a, certain modifications occur in each of the adsorbers;

the adsorber 1 has a part 90 of its isobaric production bypassed to the adsorber 2 so as to ensure its final counter-current recompression, the bypass current flowing through the pipe 77, the valve 81 being open;

the adsorber 2, for the reasons mentioned hereinbefore, rises in pressure until the final pressure P at the end of time $T_1$ is reached;

the adsorber 3 has reached the low pressure $P_0$ and an elution occurs by decompression of the adsorber 4, the decompression current when expanded forming the elution current flowing from the adsorber 4 to the adsorber 3 through the auxiliary adsorber 70, i.e. through the pipes 72 and 66, the valves 74 and 68 being open, the circulation of the elution gas occurring in the direction ($F_3$) in the adsorber 3;

the pressure of the adsorber 4 is therefore during the second decompression phase relieved to the low intermediate pressure Pi.

At the beginning of the time of duration $T_2$ which starts at the end of the time of duration $T_1$, the adsorber 1 is in the decompression phase by balancing with the adsorber 3 through the auxiliary adsorber 46, the direction of the balancing current being the direction $F_2$ which is opposite the direction $F_1$ and, for this purpose, the valves 51 and 62 being open, the balancing current flowing in the pipes 47 and 58, then at instant b, in the second decompression phase, the decompression current forming the relieved elution current flowing from the adsorber 1 to the adsorber 4 through the auxiliary adsorber 70 in the direction $F_4$, i.e. opposite to the direction $F_3$, i.e. the valves 67 and 74 are open.

The adsorber 2 is in an isobaric production phase as the adsorber during the time $T_1$ and the same phenomena occur with a stagger in time of a duration of $T_1$, the final bypass 9 occurring then to the adsorber 3;

the adsorber 3 is first in the initial recompression phase by balancing with the adsorber 1 as described before, then, at instant b in the final recompression phase by bypassing at 90 a production current of the adsorber 2;

the adsorber 4 is first in the final decompression phase as mentioned before for the adsorber 3, then, at instant b in the elution phase at pressure $P_0$ by a relieved current due to the decompression of the adsorber 1 flowing through the auxiliary adsorber 70 in the direction $F_4$ as mentioned before.

In the course of the time $T_3$ of the cycle:

the adsorber 1 is first in the final decompression phase until the instant c then in the elution phase by a relieved pressure coming from the adsorber 2 and flowing through the adsorber 70 in the direction $F_3$, i.e. the valves 75 and 67 are open;

the adsorber 2 is in the first decompression phase by balancing through the auxiliary adsorber 46 in the direction of flow $F_1$ with the adsorber 4 and, for this purpose, the valves 61 and 54 are open until instant c, then, as mentioned before, this adsorber 2 is under decompression at the intermediate pressure $P_1$ so as to form the elution current travelling toward the adsorber 1 through the adsorber 70 (direction $F_3$);

the adsorber 3 is in the isobaric production phase with, from time d, a bypassing of a production current at 90 to the adsorber 4 so as to ensure its final recompression;

the adsorber 4 is first of all in the initial recompression phase by the balancing of the adsorber 2 through the auxiliary adsorber 46 in the direction of flow $F_1$ then in the final recompression phase through a bypass 90 of the production current issuing from the adsorber 3.

During the time of duration $T_4$ which follows on the time of duration $T_3$ and at the end of which an operational cycle finishes, there are found the same operational phases staggered with respect to time, i.e. the adsorber 1 is first of all in an initial recompression by balancing with the adsorber 3 up to time d through the auxiliary adsorber 46, the balancing current flowing in the direction $F_2$, and then in final recompression through the bypass 90 of a part of the production current issuing from the adsorber 4;

the adsorber 2 is in the final decompression phase to the atmosphere then from time d, in an elution phase owing to a flow of relieved gas coming from the adsorber 3 and flowing through the auxiliary adsorber 70 in the direction of flow $F_4$;

the adsorber 3 is first of all in the decompression phase by balancing with the adsorber 1 through the auxiliary adsorber 46 in the direction $F_2$, as mentioned before, then, at instant d in the second decompression phase through the auxiliary adsorber 70 in the direction $F_4$ as mentioned before;

the adsorber 4 is in an isobaric production phase with, from time d, a partial bypassing through 90 of the production current to the adsorber 1.

As is clear from the foregoing description, it can be seen that the auxiliary adsorbers 46 and 70 are put into operation in succession as concerns the adsorber 46 in the course of successive balancings, as concerns the adsorber 70 in the course of successive pressure reliefs forming the elution gas current.

Whenever the adsorber 46 or 70 is used, the balancing currents flowing in the adsorber 46 flow in succession in the direction $F_1$, $F_2$, $F_1$, $F_2$, etc. Likewise, the elution currents flow in succession in the adsorber 70 in the opposite directions $F_3$, $F_4$, $F_3$, $F_4$.

As a result of this manner of proceeding, the balancing currents flowing in the auxiliary adsorber 46 or the elution currents flowing in the auxiliary adsorber 70 create in the balancing auxiliary adsorber 46, or in the elution auxiliary adsorber 70, a front of impurities respectively at each end of the adsorber, the two fronts of impurities being seperated by a certain longitudinal distance so that the beginning of the emission of a balancing current or an elution current occurs at the outlet of 46 or 70 with a maximal content of impurities per exit of the front of the impurities, while the end of the emission of the balancing current or the elution current occurs at the outlet of 46 or 70 with a minimal content of impurities, i.e. all the balancing operations (i.e. partial recompression of an adsorber) and elution operations (i.e. regeneration) occur with currents which have a tendency to be increasingly pure in contrast to the prior art in which these balancing and elution currents were increasingly polluted by impurities.

Consequently, as concerns the operations of elution and repressurization by balancing, which are effected in succession in a counter-current manner in the same adsorber, the impurities are urged back as close as possible to the inlet end of the adsorber, which thereafter improves its features of quality and purity of the gas produced.

The installation which permits achieving the cycle according to the pressure/time diagram diagrammatically represented in FIG. 3 for two adsorbers, has six adsorbers and three auxiliary columns. The period of the operational cycle is divided into as many sub-periods of equal duration as there are adsorbers, namely six sub-periods $T_1$, $T_2$, $T_3$, $T_4$, $T_5$ and $T_6$. Each adsorber is subjected to the same cycle as that shown in FIG. 3 in respect of the adsorber 1, but with a stagger with respect to time for each adsorber with respect to a preceding adsorber of a duration equal to the sub-period, as shown in FIG. 3 in respect of the adsorber 2 relative to the adsorber 1. One of the features of the cycle is the division into two successive stages of the counter-current decompression phase with balancing. Another feature of the cycle is the spreading of the production phase over two sub-periods.

In the adsorber 1 the cycle is carried out in the following manner:

(a) During the sub-periods $T_1$ and $T_2$, the adsorber is in the isobaric production phase 101 at pressure P and with a counter-current. A fraction of the production current drawn off in the end part of the sub-periods $T_1$ and $T_2$ is used for the counter-current final recompression of the adsorbers 2 and 3 respectively.

(b) During the sub-period $T_3$ the adsorber is in the counter-current decompression phase down to an intermediate pressure Pe achieved first of all by a first balancing of the pressure P at the pressure P'e with the adsorber 4 through a first auxiliary column 111 (direction $F_1$), and then by a second balancing of the pressure P'e at the pressure Pe with the adsorber 5 through a second auxiliary column 112 (direction $F_2$).

(c) During the sub-period $T_4$, the adsorber is first of all in a counter-current decompression of the pressure Pe to the pressure Pi with a drawing-off of current for ensuring the elution of the adsorber 6 through a third auxiliary column 113 (direction $F_3$), then in a counter-current final decompression of the pressure Pi to the pressure Pf with discharge of the residues.

(d) During the sub-period $T_5$, the adsorber is first of all in the elution phase by the use of the gas drawn off from the adsorber 2 which is in the decompression phase from Pe to Pi, then in a first recompression phase up to Pe by balancing with the adsorber 3 which is in the decompression phase from P'e to Pe.

(e) During the sub-period $T_6$, the adsorber is first of all in the second recompression phase to P'e by balancing with the adsorber 4 which is in the decompression phase from P to P'e, then in the final recompression phase up to P by bypassing a part of the production coming from the adsorbers 5 and 6 which are in the production phase.

In respect of the adsorber 2 the cycle occurs in the same way as that described for the adsorber 1 (same succession of phases with the same pressures and the same durations) but staggered with respect to time by the duration of a sub-period. However, the directions of flow through the auxiliary columns 111, 112, 113 of the gaseous current issuing from the three co-current decompression phases of the adsorber 2 are reversed (directions $F'_1$, $F'_2$, and $F'_3$) with respect to the directions of flow to the homologous currents issuing from the three decompression phases of the adsorber 1, as shown in FIG. 3.

As concerns the adsorber 3, the cycle of which is staggered with respect to time by a sub-period relative to the adsorber 2, the directions of flow of the decompression currents through the columns 111, 112, 113 are again reversed relative to the directions of flow of the decompression currents issuing from the adsorber 2. The same is true of the adsorbers 4, 5, and 6 so that the directions of flow through the columns 111, 112, and 113 will be respectively $F_1$, $F_2$, and $F_3$ for the decompression currents issuing from the adsorbers 1, 3 and 5 and $F'_1$, $F'_2$ and $F'_3$ for the decompression currents issuing from the adsorbers 2, 4 and 6. In this way there is achieved the alternation of the directions of flow through each auxiliary column between two successive and homologous decompression currents.

It can also be seen that the production of the purified gas is ensured simultaneously by two adsorbers, owing to the spreading over two consecutive sub-periods of the production phase of the cycle. Thus, during the sub-period $T_2$, the diagrams of FIG. 3 clearly show a production in the adsorbers 1 and 2. During the sub-period $T_3$, the production is ensured simultaneously in the adsorbers 2 and 3, and so on for the other sub-periods. This arrangement permits, for a given adsorber size and with only six adsorbers, the doubling of the flow of treated gas and the production of purified gas, relative to the solution comprising four adsorbers as defined by the installation of FIG. 1, operating according to the cycle of FIG. 2 in which the production phase involves only one sub-period of the cycle.

FIG. 4 shows, without describing it in detail, a cycle having eight adsorbers and three auxiliary columns 121, 122 and 123 only two of which, namely 121 and 122 with directions of flow respectively $F_4$, $F'_4$ and $F_5$, $F'_5$ alternately employed, are shown.

As the time of passage of the gas through the column 122 occurs during a period exceeding the sub-period of the cycle, it is essential for the good operation of the installation to employ another column 123 (not shown) which performs the same function as the column 122, but staggered with respect to time by a sub-period relative to the column 123, and directions of flow also alternately employed. The cycle has a single balancing stage but a production phase spread over three sub-periods, which ensures at any moment a simultaneous production in three adsorbers.

Figure 5:
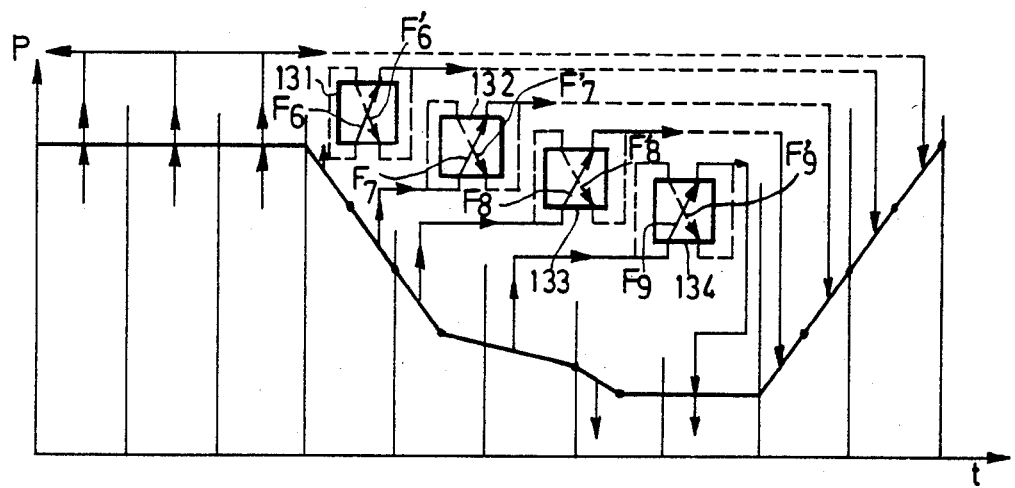

FIG. 5 shows a cycle having ten adsorbers and five auxiliary columns 131, 132, 133, 134, 135 (the latter has not been shown but performs the same function as the column 134 as explained hereinbefore) with alternating directions of flow, respectively $F_6$, $F'_6$; $F_7$, $F'_7$; $F_8$, $F'_8$ and $F_9$, $F'_9$. The cycle has three balancing stages and one production phase over three sub-periods, i.e. a simultaneous production in three adsorbers.

Figure 6:
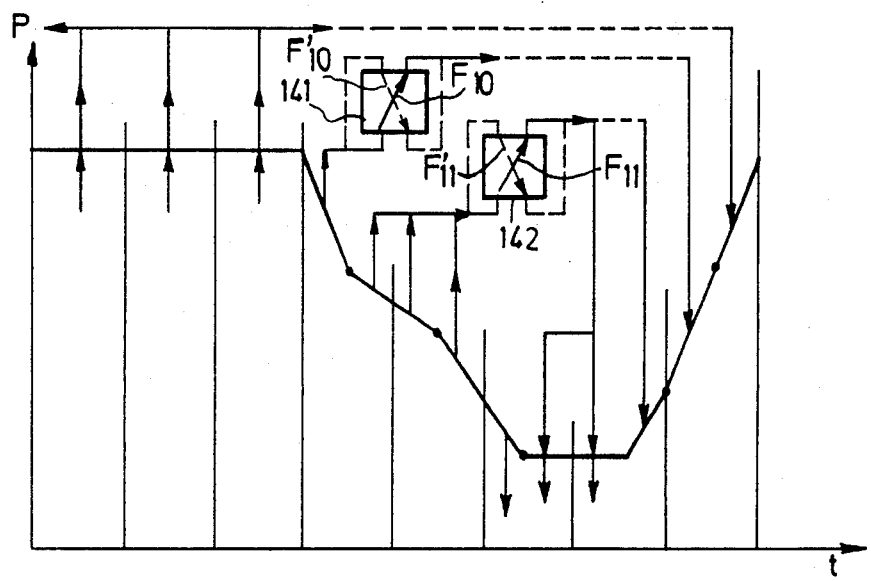

FIG. 6 shows a cycle having eight adsorbers and three auxiliary columns 141, 142 and 143 (not shown) with alternating directions of flow, respectively $F_{10}$, $F'_{10}$ and $F_{11}$ and $F'_{11}$. The cycle ensures a simultaneous production in three adsorbers and has two balancing stages. The decompression providing the elution gas is interposed between the two decompression stages achieving the balancing of the pressures. Further, the current of the second decompression providing the elution gas and the current of the third decompression achieving a balancing, pass through the same auxiliary column 142. The auxiliary column 143 (not shown) having alternating directions of flow, performs the same function as the auxiliary column 142.

Figure 7:
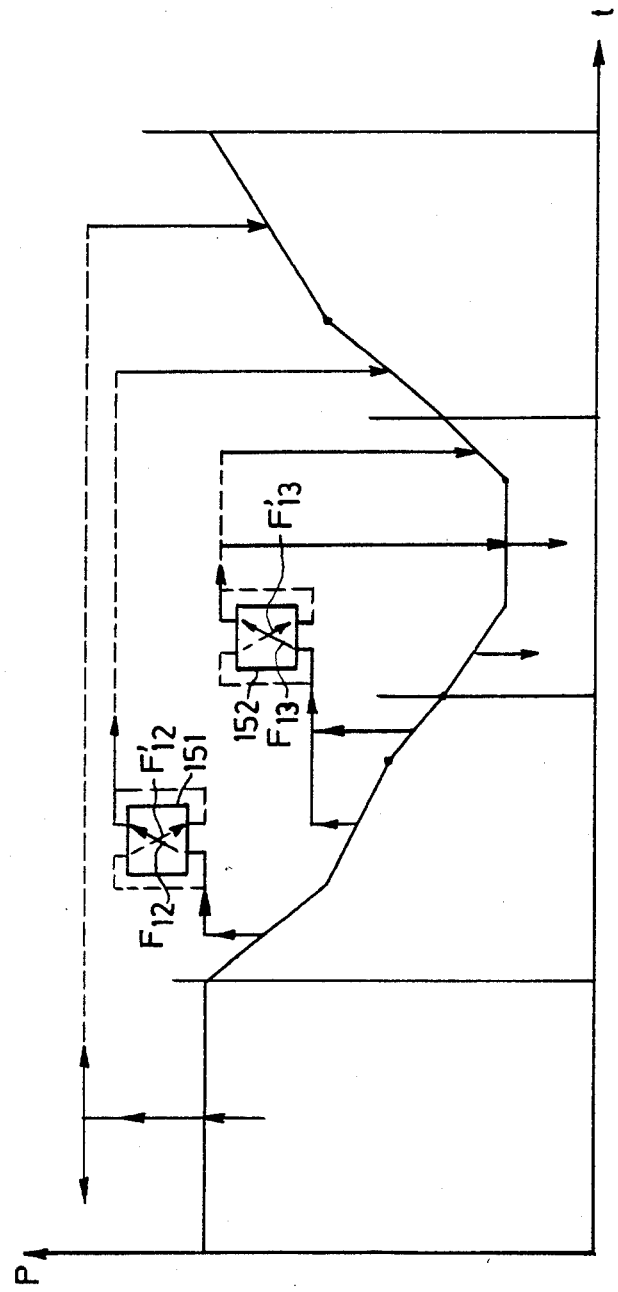

FIG. 7 shows a cycle having four adsorbers with only two auxiliary columns 151 and 152 and alternating directions of flow, respectively $F_{12}$, $F'_{12}$ and $F_{13}$ and $F'_{13}$. The cycle has, as in FIG. 6, a decompression phase for elution interposed between the two decompression stages with balancing, and, as in FIG. 6, the currents of the second and third decompressions for elution and balancing, flow through the same auxiliary column 152.

What is claimed is:

1. A method for separating by adsorption a composite gas constituted by at least two components, said method employing at least three adsorbers in each of which adsorbers are carried out, in a cyclic and staggered manner with respect to time from one adsorber to another adsorber, the following successive operational phases:
    (a) a production operational phase with a co-current flow of said composite gas and production of a separated gaseous current and trapping of at least one component in said adsorber with, during a part of said production phase, the bypassing of a fraction of said separated gaseous current for a final counter-current repressurization of a second adsorber in course of repressurization in accordance with phase (g) mentioned below;
    (b) a co-current depressurization phase with a drawing-off of a gaseous current for repressurization by balancing at an intermediate pressure level of an adsorber in the course of repressurization in accordance with phase (f) mentioned below, said depressurization phase corresponding to a balancing and being optionally divided into a plurality of depressurization stages, each one thereof, for the repressurization of various adsorbers, at intermediate pressure levels, again in accordance with said phase (f);
    (c) a co-current depressurization phase down to a low intermediate pressure with drawing-off of a gaseous current for the purpose of the elution of an adsorber in the course of elution, in accordance with phase (e) mentioned below;
    (d) a final counter-current depressurization phase down to a relatively low-pressure;
    (e) a counter-current elution phase at regeneration pressure, the elution current coming from an adsorber in the course of depressurization in accordance with phase (c);
    (f) a counter-current repressurization phase by balancing of pressures with an adsorber in the course of depressurization in accordance with phase (b), said repressurization phase being optionally divided into a plurality of successive stages by balancing of the pressures with the various adsorbers in the course of depressurization in accordance with phase (b);
    (g) a final counter-current repressurization phase, the repressurization current coming from a bypassing of a fraction of the current issuing from an adsorber in course of production in accordance with phase (a);

the improvement wherein the successive balancing phases between a first pair of adsorbers and then a second, different pair of adsorbers are carried out by passing the balancing current from a co-current depressurization phase of one adsorber into one end of an auxiliary column employing a longitudinal segregation of the undesirable component or components, through that auxiliary column and out the other end thereof to a counter-current repressurization phase of another adsorber, currents corresponding to two successive balancings between the adsorbers in said first pair and then between the adsorbers in said second different pair flowing through said column in opposite directions of flow.

2. A method for separating by adsorption a composite gas according to claim 1, wherein the successive depressurization phases of an adsorber for the elution of another adsorber are also carried out by circulation of the elution gas in an auxiliary column employing a longitudinal segregation of the undesirable component or components, the currents of elution of two successive depressurization phases having opposed directions of flow.

3. A method for separating a composite gas according to claim 2, wherein the auxiliary column or columns employing a longitudinal segregation of the undesirable component or components are simple elongated vessels having a volume at least equal to the volume of the depressurized gas.

4. A method for separating a composite gas according to claim 2, wherein the column or columns employing a longitudinal segregation are vessels charged with an inner filler material leaving dead spaces the volume of which spaces is at least equal to the volume of the depressurized gas.

5. A method for separating a composite gas according to claim 1, wherein the column or columns employing a longitudinal segregation of the trapped component are adsorption columns filled with a suitable adsorbent for selectively stopping the undesirable component or components of the gas which is desired to be obtained in the purified stage.

6. A method for separating a composite gas according to claim 1, wherein the auxiliary column or columns employing a longitudinal segregation of the undesirable component or components are simple elongated vessels having a volume at least equal to the volume of the depressurized gas.

7. A method for separating a composite gas according to claim 1, wherein the column or columns employing a longitudinal segregation are vessels charged with an inner filler material leaving dead spaces the volume of which spaces is at least equal to the volume of the depressurized gas.

8. A method according to claim 1, wherein the composite gas treated is a gas mixture the main component of which mixture is hydrogen for the purpose of the purification thereof.

9. A method according to claim 1, wherein the gas treated is a gas mixture one of the components of which mixture (such as helium) is not adsorbed, or is relatively little adsorbed, relative to the other components of the mixture for the purpose of the purification of said one component.

10. In an installation for separating by adsorption a composite gas, said installation comprising at least three adsorbers each having an inlet end and an outlet end which is opposed to said inlet end, connecting pipes each having a stop valve for connecting said inlet end of each adsorber to a source of composite gas, treated gas production pipes each having a stop valve issuing from said outlet end of each adsorber, drawing-off pipes each having a stop valve connected to said inlet end of each adsorber; the improvement comprising at least one vessel employing the longitudinal segregation of the undesirable component or components and having a first end and a second end, pipes each having a stop valve and connecting said first end of said vessel to the outlet end of at least a first part of said adsorbers and connecting said second end of said vessel to the outlet end of at least a second part of said adsorbers which is complementary to or equal to said first part, said stop valves being selectively opened to connect through said vessel a first pair of adsorbers, such that gas flows therethrough in one direction from one to the other of the adsorbers in said first pair, said stop valves being next selectively opened to connect through said vessel a second different pair of adsorbers, such that gas flows therethrough in the opposite direction from one to the other of the adsorbers in said second pair.

11. A separating installation according to claim 10, comprising four adsorbers and two vessels employing a longitudinal segregation of the trapped gases.

12. A separating installation according to claim 10, comprising six adsorbers and three vessels employing a longitudinal segregation of the treated gases.

13. A separating installation according to claim 10, comprising eight adsorbers and three vessels employing a longitudinal segregation of the treated gases.

14. A separating installation according to claim 10, comprising ten adsorbers and five vessels employing a longitudinal segregation of the treated gases.

* * * * *